United States Patent
Szasz

[11] 3,801,900
[45] Apr. 2, 1974

[54] MEASURING SYSTEM FOR NON-DESTRUCTIVE THICKNESS MEASUREMENT OF ELECTRICALLY NON-CONDUCTIVE COATINGS ON ELECTRICALLY CONDUCTIVE BODIES

[75] Inventor: Imre Szasz, Dicken, Switzerland
[73] Assignee: Paratronic AG, Zug, Switzerland
[22] Filed: Nov. 28, 1972
[21] Appl. No.: 310,106

[30] Foreign Application Priority Data
Dec. 8, 1971 Germany.............................. 2160963

[52] U.S. Cl............................................. 324/61 R
[51] Int. Cl............................................. G01r 27/26
[58] Field of Search ..... 324/61 R; 317/246; 323/93; 340/200

[56] References Cited
UNITED STATES PATENTS
3,290,588  12/1966  Norwich............................ 324/61 R
3,426,271  2/1969  Alais................................. 324/61 R
2,744,238  5/1956  Andresen.......................... 324/61 R
3,000,101  9/1961  Giardino et al............... 324/61 R X Primary Examiner—Stanley T. Krawczewicz
Attorney, Agent, or Firm—Browdy and Neimark

[57] ABSTRACT

A measuring device for non-destructive thickness measurement of a dielectric coating on an electrically conductive body comprises a conductive probe plate adapted to be applied to the surface of the dielectric coating; a high frequency voltage generator connected to either the probe plate or the conductive body for supplying a high frequency signal thereto; a reference capacitor having known capacitance connected to the probe plate or the conductive body, whichever is not connected to the high frequency voltage generator; a measuring device connected across the reference capacitor for measuring the voltage drop across the reference capacitor; and a display device connected to the measuring device for displaying the measured voltage drop, which directly indicates the layer thickness of the dielectric coating.

17 Claims, 4 Drawing Figures

MEASURING SYSTEM FOR NON-DESTRUCTIVE THICKNESS MEASUREMENT OF ELECTRICALLY NON-CONDUCTIVE COATINGS ON ELECTRICALLY CONDUCTIVE BODIES

The present invention concerns a measuring system for non-destructive thickness measurement of electrically non-conductive coatings on electrically conductive bodies, in particular plastic coatings on metallic bodies.

Plastic coating of metallic objects, as for purposes of electrical insulation, corrosion-proofing, wear resistance and appearance, is being increasingly applied in industry. This has given rise to the need for a low-priced measuring device permitting the coating thickness of known plastics to be measured in a simple yet accurate manner.

For this purpose, the invention is based on the principle of capacitive layer thickness measurement wherein the layer to be measured is enclosed between two capacitor plates, whereupon the capacitor capacity developed by the layer thickness is determined.

As is known, the capacity C of a plate capacitor is calculated by the following formula:

$$C = 1/d \cdot \text{epsilon}_r \cdot \text{epsilon}_o \cdot F \qquad (1)$$

where $\text{epsilon}_r$ is the dielectric constant of the coating material; $\text{epsilon}_o$ is the dielectric constant of the vacuum; $F$ is the surface area; $d$ is the distance between the capacitor plates. In an a.c. circuit of frequency $f$ and the sinusoidal voltage U, the capacitor takes up the current $i$ as determined by the following formula:

$$i = 1/D \cdot U \cdot 2 \text{ pi} \cdot f \cdot \text{epsilon}_r \cdot \text{epsilon}_o \cdot F \qquad (2)$$

It follows from this formula that when frequency and voltage of the alternating current are kept constant, the product of $i$ and $d$ is also constant. There is therefore a hyperbolic relation between the current and the plate distance or the thickness of the coating material. For the purposes of the present invention, the working range of this hyperbolic function is selected in such a manner that it coincides with a portion of the hyperbolic limb which is as nearly straight as possible, in order to permit the scale division of the measuring system to be made approximately uniform.

Among the known systems is a measuring circuit which is based on the principle of capacitive voltage division and in which the capacity to be measured is series-connected to a reference capacitor of known capacity and is connected to an a.c. supply and in which the voltage drop across the unknown capacity is measured. However, such a measuring circuit is not suitable for use in a layer thickness measuring system, which should have a maximum measuring accuracy while still indicating a wide measuring range in approximately linear fashion. The drawbacks of the known measuring circuit will be dealt with in greater detail in the subsequent explanation of the principle of the invention.

The object of the present invention is to provide for a layer thickness measuring system which presents the simplest possible construction, has a high measuring accuracy and is very simply and reliably operable and readable, even by unskilled personnel. In particular, the said system should be suitable not only for measuring on flat surfaces, but also for measuring on slightly rounded surfaces, such as the measuring of the paint layer thickness on motor-car bodies.

In order to achieve the said object, the present invention provides for a system wherein the capacity to be measured (comprising the electrically conductive body supporting the coating material, the insulating coating and a measuring probe plate) is series-connected to a reference capacitor of known capacity and is connected to a high-frequency voltage source, and the voltage drop across the reference capacitor is measured. The voltage drop stands in a determinate relation to the current $i$ in the series connection of the capacities and therefore also gives a criterion for the coating thickness $d$. The known dielectric constants of the coating material permit the coating thickness to be calculated. Of course, it is instead possible directly to calibrate the measuring system against plastic layers of known thickness.

In contrast with the known capacity measuring circuit, the system claimed hereunder ensures substantially better utilization of the measuring range determined by the capacity of a reference capacitor, so that a measuring range comprises between 1 and 100 layer thickness units with only a slight non-linearity of the indication. Yet still the measuring error is only about ± 5 percent of the value read.

Embodiments of the invention are now to be described by way of example with reference to the accompanying drawings, in which.

Figure 1:
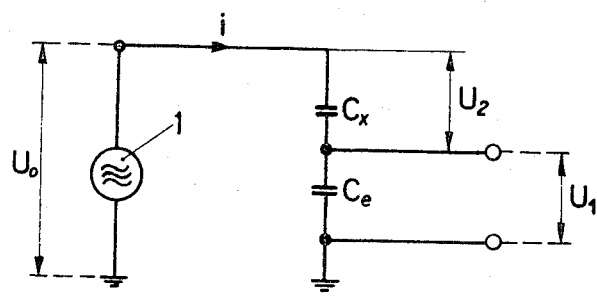
FIG. 1 shows the circuit principle of the layer thickness measuring system claimed hereunder.

FIG. 1 shows the principle of the circuit arrangement according to the invention. The high-frequency voltage source 1 supplies a current $i$ passing through the capacitors $C_x$ and $C_e$, where $C_x = C_e \cdot 1/U_o/U_1 - 1$. From the voltage $U_1$ across the capacitor $C_e$, it is possible to calculate the layer thickness d by the following formula:

$$d = 1/C_e \cdot \text{epsilon}_r \cdot \text{epsilon}_o \cdot F \, (U_o - 1)/U_1 \qquad (3)$$

It follows that there is also a hyperbolic function between $U_1$ and $d$. By suitable selection of the values of $C_e$ and $U_o$, it is possible to place the working range of the system in a portion of the hyperbola as nearly linear as possible.

The expediency of measuring the voltage across the reference capacitor and not across the capacitor of the unknown capacity $C_x$ follows from the following considerations: The generator voltage $U_o$ applied to the measuring circuit is related to the measuring voltage $U_1$ across the reference capacitor as follows:

$$U_o/U_1 = C_e + C_x/C_x$$

wherefrom follows:

$$U_1 = U_o \, C_x/C_e + C_x$$

The sensitivity and, accordingly, the accuracy of the measurement is greatest when the capacity to be measured and the reference capacity have the same magnitude. The optimum is $C_x = C_e$. In the present case, $C_e$ must be selected according to the smallest layer thickness to be measured in practice. For the case of $C_x = C_e$, the following applies:

$$U_1 = U_2 = 0.5\ U_o$$

where $U_2$ is the voltage across the capacitor $C_x$ to be measured. On the assumption that the same reference capacitor of capacity $C_e$ is to be used to measure maximum layer thicknesses which are 100 times greater than the smallest layer thickness assumed, the capacity $C_x{}^*$ to be measured assumes the following value:

$$C_x{}^* = 0.01\ C_e$$

For this capacity $C_x{}^*$, the measuring voltage $U_1$ is $$U_1{}^* = U_o \cdot C_x{}^* C_e + C_x{}^* = U_o\ 0.01\ C_e/1.01\ C_e = \text{approximately } 0.01\ U_o.$$

Compared with the above stated measuring voltage $U_1 = 0.5\ U_o$ for the smallest layer thickness, the measuring voltage $U_1{}^*$ for the greatest layer thickness to be measured is greater by the factor 50.

For comparison, it may be appropriate here to give the voltage increase in the case where the voltage $U_2$ is measured by the known capacity measuring circuit, with conditions otherwise equal:

$$U_2{}^* = U_o \cdot C_e/C_e + C_x{}^* = U_o\ C_e/1.01\ C_e = \text{approximately } U_o.$$

Compared with the value for the smallest layer thickness of $U_2 = 0.5\ U_o$, the voltage increase in this case is only by the factor 2.

When $C_x$ is small compared with $C_e$, the voltage $U_1$ is also small compared with $U_o$. When $C_e$ is reduced, $U_1$ also grows greater, so that the sensitivity of the measuring instrument can be increased. It is preferable to provide for decadic variability of $C_e$, so that the indication values on the measuring instrument differ by a decimal place in each case.

Following is a description of a practical circuit arrangement, for a measuring system according to the present invention.

Figure 2:
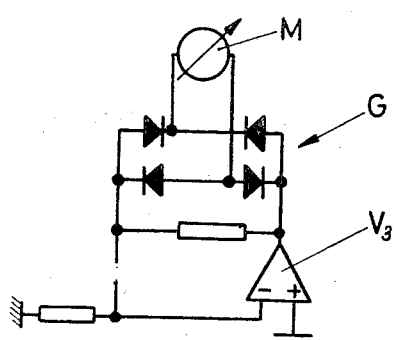
FIG. 2 shows the circuit diagram of a voltage stabilizing system.

FIG. 2 first shows a circuit arrangement designed to stabilize the voltage of the battery feeding the measuring system. Two transistors T1 and T2 serve to form a stabilized virtual centre. The centre of the two transistors is feedback-connected to the integrated amplifier component V1. The stabilized voltage thus obtained is injected into the circuit arrangement shown in FIG. 3.

Figure 3:
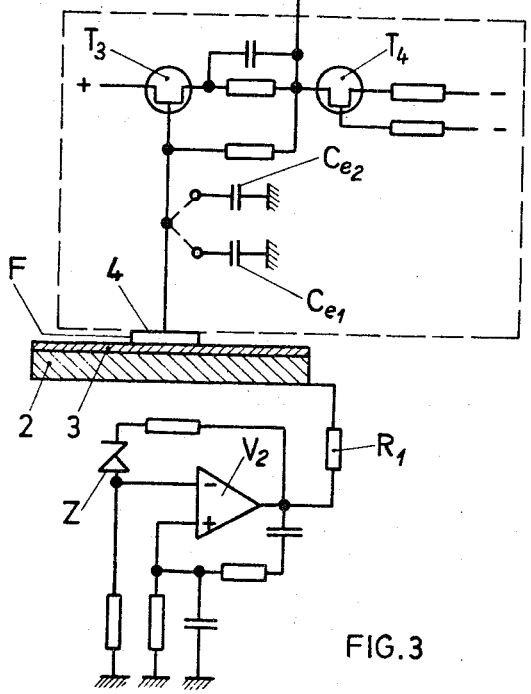
FIG. 3 shows the circuit diagram of the embodiment described.

The oscillator shown at the bottom of FIG. 3 oscillates with a frequency of about 10 kc/s which is determined by a Wien bridge to whose centre an integrating amplifier component V2 is connected. For stabilizing, the output of V2 is fed back to the input of the latter across a Zener diode Z.

The output voltage of the oscillator is applied across a resistor R1 to the metallic baseplate 2 on which is located the layer 3 to be measured. The plate 4 of the probe, later to be described, is then pressed against the layer. The probe plate 4 is connected to the reference capacitor. In the example shown, there are two reference capacitors $C_{e1}$ and $C_{e2}$ whose capacities differ by a power of ten. The capacity $C_x$ with respect to the measuring probe is only a few picofarads for the thicker layers and for a probe area of about 10 mm², while the capacity of the probe lead is about 30 to 80 picofarads. This unfavourable ratio would defeat accurate measurement, and for this reason the probe case, indicated by a broken line in FIG. 3, contains an impedance converter consisting of symmetrically connected calibrated transistors T3 and T4, which also ensure stability and temperature balance.

The measurement signal obtained at the output of the impedance converter is passed to the circuit component shown at the top of FIG. 3. This circuit component as well as the oscillator component described and the circuit component according to FIG. 2 are accommodated in a common case. The measuring voltage is amplified by the integrated amplifier component V3, rectified by a bridge-type rectifier assembly and passed to the measuring system M, such as a micro-ammeter.

Figure 4:
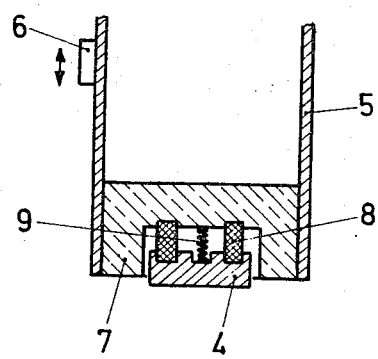
FIG. 4 shows the probe tip for the formation of a capacitor of capacity C, with the conductive body layer of the specimen, not shown.

In FIG. 4, the measuring probe consists of the probe case 5, only partly shown, which serves as a grip and as a receptacle for circuit components. A slide switch 6 serves to change over the reference capacitors. The probe consists of a circular metal plate 4 of about 10 mm diameter. This plate size represents a reasonable compromise, in that it ensures an adequate sensitivity of the measuring system with a tolerably sized electronic assembly, while still being capable of registering thickness variations in the coating over the smaller ranges. The probe plate is arranged in an insulated case 7 and is fastened thereto by rubber feet 8 in a manner permitting all-round tilting. The contact spring 9 ensures the electric connection between the probe plate 4 and the reference capacitor in the case 5. When the probe is applied to the coating 3, the said elastic fastening presses the measuring plate with invariably even pressure against the surface of the coating. The measuring result is therefore independent of the particular pressure exerted by the probe on the coating.

To permit layer thickness measurements to be made on rounded objects also, the probe plate 4 may be made of an elastic conductive material, such as conductive rubber.

Application of the circuit arrangements claimed hereunder is not confined to the measuring of the layer thickness at individual points; such circuit arrangements may also be employed for continuous layer thickness monitoring, as for production control purposes.

I claim:

1. A measuring device for non-destructive thickness measurement of a dielectric coating on an electrically conductive body comprising a conductive probe plate adapted to be applied to the surface of the dielectric coating, whereby said probe plate acts as a first capacitor plate, the conductive body acts as a second capacitor plate, and the dielectric coating acts as an insulating capacitive layer when said probe plate is applied to the surface of the dielectric coating;

high frequency voltage generating means connected in series to one of said capacitor plates for supplying a high frequency signal thereto;

a reference capacitor having known capacitance connected in series to the other of said capacitor plates;

measuring means connected across said reference capacitor for measuring the voltage drop across said reference capacitor; and display means connected to said measuring means for displaying the measured voltage drop, said voltage drop directly indicating the layer thickness of the dielectric coating.

2. The measuring device of claim 1, wherein the capacitance of said reference capacitor approximately corresponds to the capacitance of the smallest layer thickness which is to be measured.

3. The measuring device of claim 1 comprising several reference capacitors, said reference capacitors being selectively series connected to said probe plate.

4. The measuring device of claim 1 comprising at least two reference capacitors selectively series connected to said probe plate, wherein the capacitance of one of said reference capacitors approximately corresponds to the capacitance of the smallest layer thickness which is to be measured and the capacitance of the other reference capacitors vary decadicly therefrom.

5. The measuring device of claim 1 comprising means for varying the voltage of said high frequency voltage generating means and means for adjusting the capacitance of the reference capacitor.

6. The measuring device of claim 1 comprising an integrated amplifier having an input and an output connected to said high frequency voltage generating means, said output of said amplifier being connected back by a Zener diode to said input of said amplifier.

7. The measuring device of claim 1 comprising an impedance converter connected between said reference capacitor and said display means.

8. The measuring device of claim 1 comprising amplifying means connected to said reference capacitor and rectifying means connected between said amplifying means and said display means.

9. The measuring device according to claim 1, wherein said probe plate is circular shaped, having a diameter of approximately 10 mm.

10. The measuring device of claim 1 comprising a probe casing, said probe casing accommodating said reference capacitor and said probe plate in immediate proximity therewith.

11. The measuring device of claim 7 comprising a probe casing, said probe casing accommodating said reference capacitor and said probe plate in immediate proximity therewith.

12. The measuring device of claim 11 wherein said impedance converter is accommodated within said probe casing.

13. The measuring device of claim 4 comprising a probe casing, said probe casing accommodating said reference capacitor and said probe plate in immediate proximity therewith.

14. The measuring device of claim 13 wherein said probe casing includes a switching means connected to said reference capacitors for selectively connecting said reference capacitors to said measuring means.

15. The measuring device of claim 14 comprising rubber fastening means resiliently connecting said probe plate to said insulating case for permitting all-around tilting of the device.

16. The measuring device of claim 10 comprising an insulating case within said probe casing enveloping said probe plate.

17. The measuring device of claim 16 wherein said probe plate comprises elastic electrically conductive material.

* * * * *

UNITED STATES PATENT OFFICE
CERTIFICATE OF CORRECTION

Patent No. 3,801,900   Dated April 2, 1974

Inventor(s) Imre SZASZ

It is certified that error appears in the above-identified patent and that said Letters Patent are hereby corrected as shown below:

Column 3, line 18, delete "$U_1^* = U_o \cdot C_x^* C_e + C_x^* = U_o 0.01\ C_e/1.01\ C_e =$" and insert therefore --$U_1^* = U_o \cdot C_x^*/C_e + C_x^* = U_o\ 0.01\ C_e/1.01\ C_e =$--.

Signed and sealed this 10th day of September 1974.

(SEAL)
Attest:

McCOY M. GIBSON, JR.　　　　　C. MARSHALL DANN
Attesting Officer　　　　　　　Commissioner of Patents